United States Patent [19]
Walker et al.

[11] Patent Number: 6,111,953
[45] Date of Patent: Aug. 29, 2000

[54] METHOD AND APPARATUS FOR AUTHENTICATING A DOCUMENT

[75] Inventors: Jay S. Walker, Ridgefield, Conn.; Bruce Schneier, Minneapolis, Minn.; James A. Jorasch, Stamford, Conn.

[73] Assignee: Walker Digital, LLC, Stamford, Conn.

[21] Appl. No.: 08/859,722

[22] Filed: May 21, 1997

[51] Int. Cl.[7] ................................................ H04K 1/00
[52] U.S. Cl. .......................... 380/51; 380/55; 705/67; 713/179
[58] Field of Search ........................ 380/23, 25, 30, 380/51, 55; 705/67; 713/179

[56] References Cited

U.S. PATENT DOCUMENTS

| | | |
|---|---|---|
| 3,541,960 | 11/1970 | Dilsner et al. . |
| 4,385,285 | 5/1983 | Horst et al. . |
| 4,413,951 | 11/1983 | Allen, Jr. . |
| 4,725,718 | 2/1988 | Sansone et al. ............................. 380/51 |
| 4,816,655 | 3/1989 | Musyck et al. . |
| 4,893,338 | 1/1990 | Pastor ........................................ 380/51 |
| 5,001,752 | 3/1991 | Fischer ...................................... 380/30 |
| 5,090,699 | 2/1992 | Friedman . |
| 5,142,577 | 8/1992 | Pastor ........................................ 380/51 |
| 5,157,726 | 10/1992 | Merkle et al. ............................. 380/55 |
| 5,191,613 | 3/1993 | Graziano et al. ......................... 380/25 |
| 5,214,702 | 5/1993 | Fischer ...................................... 380/30 |
| 5,239,165 | 8/1993 | Novak . |
| 5,274,567 | 12/1993 | Kallin et al. . |
| 5,341,428 | 8/1994 | Schatz . |
| 5,373,561 | 12/1994 | Haber et al. .............................. 380/25 |
| 5,388,158 | 2/1995 | Berson .................................... 3380/23 |
| 5,398,283 | 3/1995 | Virga ......................................... 380/54 |
| 5,426,700 | 6/1995 | Berson ....................................... 380/51 |
| 5,586,036 | 12/1996 | Pintsov ...................................... 380/51 |
| 5,633,932 | 5/1997 | Davis et al. ............................... 380/51 |
| 5,652,794 | 7/1997 | Lepetit et al. ............................. 380/51 |
| 5,768,384 | 6/1998 | Berson ....................................... 380/51 |
| 5,901,224 | 5/1999 | Hecht ......................................... 380/51 |
| 5,912,974 | 6/1999 | Holloway et al. ........................ 380/51 |
| 5,923,762 | 7/1999 | Dolan et al. .............................. 380/51 |
| 5,923,763 | 7/1999 | Walker et al. ............................. 380/51 |
| 5,926,551 | 7/1999 | Dwork et al. ............................. 380/51 |

OTHER PUBLICATIONS

Barton Crockett, "Chase Readies Wholesale Image Service", The American Banker, Sep. 13, 1993 at p. 15.
"Secure Check –4+ Compatible With HP Laserjet 4 Plus", PC Business Products, Jul. 1994.
Vern Lysford, "Create–A–Check Software Review", Management Accounting (USA), Sep. 1994 at p. 71.
Paul J. Geary and R. David Randall, "Create–A–Check Software", Massachusetts CPA Review, Spring 1995 at p. 32.
Geoffrey Wheelwright, "New Ways to Beat the Fraudsters", Financial Times, Jul. 5, 1995 at p. 4.
"Photo Checks Reduces Fraud, Approves Checks", NCUA Watch, Feb. 19, 1996 at p. 5.
"Toppan Printing Develops Transparent Bar Code System", Japan Economic Newswire, May 29, 1996.
Tony Timmons, "Check Fraud Costs Local Businesses More Than $180 Million Annually", Central Penn Business Journal, Jul. 19, 1996 at p. 2.

*Primary Examiner*—Salvatore Cangialosi
*Attorney, Agent, or Firm*—Dean Alderucci; Peter J. Vogel

[57] ABSTRACT

A system is described whereby a document may be authenticated by an issuer thereof and verified by a recipient. Data from the document, at least a portion of which is specific to the document and identifies the document, is input to an authenticating device using an input device. A computing device, including a cryptographic processor and a memory, is coupled to said input device and receives a signal representing the data. The computing device performs a cryptographic operation based on the data to produce encrypted authentication data unique to the document. An output device is coupled to the computing device and affixes a representation of the authentication data on the document. A similar device, including a display device, is used to input the encrypted data, perform a cryptographic operation to decrypt the data, and compare the decrypted data with document identification data to verify the document. Encryption and decryption are performed using a private key/public key pair.

61 Claims, 5 Drawing Sheets

METHOD AND APPARATUS FOR AUTHENTICATING A DOCUMENT

BACKGROUND OF THE INVENTION

This invention relates to a method and apparatus for providing reliable authentication of a document, and for verifying the authenticity of a document, by using a unique encrypted code which is created and affixed to the document.

It is well known that corporate documents, particularly negotiable instruments such as checks and stock certificates, are susceptible to counterfeiting. With the advent of high-quality, low-cost color computer printers, this problem has become even more acute. Printers of negotiable instruments (including commercial check printers and the U.S. Bureau of Printing and Engraving) have introduced a variety of anti-counterfeiting devices into their paper and/or printed designs. Examples of such devices include color-shifting ink, holographic strips, watermarking, and microprinting. These measures naturally add to the complexity and production cost of the documents, while at the same time the security they provide is constantly being eroded by more sophisticated counterfeiting techniques. Accordingly, there is a need for a reliable, efficient, and cost-effective solution to the problem of counterfeit negotiable instruments.

In addition, in the case of a check, for example, even if the blank check is genuine, the recipient still has a need to determine whether items such as the date, the amount, and the name of the payee, are as written by the issuer or have been subsequently altered.

A number of methods and devices for authenticating documents (including negotiable instruments such as checks) have recently been proposed. Examples of devices which cryptographically certify the authenticity and integrity of electronic documents may be found in U.S. Pat. Nos. 5,189,700; 5,157,726; 5,136,643; 5,136,647; 5,136,646; 5,022,080; 5,001,752; and 4,786,940. These patents disclose devices that input image data in digital form, cryptographically certify the digital data (for example, by adding and hashing additional data representing a certificate with a representation of a document), and output a digital message. Use of these devices generally requires that the document image be input to the device in digital form. Accordingly, the use of such data certification devices with paper documents would require the addition of a document scanner to generate a representation of the document in digital form, leading to increased device cost and complexity.

Furthermore, because image data representing the document would be included in the cryptographic message, one wishing to verify the document data would also have to create a digital representation of the message—a costly and possibly impractical operation for those with limited capabilities. The complex problem of ensuring that the digitization of the document at the time of certification is the same digitization at the time of verification has not been reliably solved.

U.S. Pat. No. 5,388,158 discloses an apparatus that affixes to a document a label created by scanning the document and producing a digital signal; the digital signal is compressed, encrypted, and coded as a two-dimensional bar code. This apparatus, like those discussed just above, creates a digital representation of an image of the document, as opposed to using specific data from the document.

U.S. Pat. No. 5,341,428 discloses a document verification system in which information specific to a document is encrypted and printed on the document, and the recipient of the document is issued a "smart card" containing the encryption algorithm. A third party can then verify that the holder of the card is the legitimate holder of the document by inserting the card into a device which identifies the cardholder with the card and decrypts the message on the document. This system thus requires both a smart card and a terminal, and furthermore requires that the recipient of the document identify himself to a third party in order to obtain verification of the document. Such a system may be needlessly complex in many instances, and limits the number of persons who can verify the document to those holding smart cards with the appropriate algorithm.

A system for on-site printing of checks has recently been reported in which the issuer of a check may print a check on blank check stock, and also print thereon visibly obscured information providing traceability. Another system has been reported for on-site check printing in which a microscopic character representation of the check amount is printed on the check.

There remains a need for a simple and reliable system which can perform both authentication and verification of documents by encrypting and decrypting information read from the face of the document, as opposed to imaging the face of the document and processing a representation thereof.

SUMMARY OF THE INVENTION

The present invention provides a method and apparatus for reliable authentication and verification of documents, such as checks. Broadly, a user may verify the authenticity of a document based on a unique, encrypted code which is created and affixed to the document, where the encrypted code is based on data in the document and use of a public key/private key pair.

One unique aspect of our invention involves authenticating a document by creating an encrypted and authenticatable code which is affixed to the document. A device used in implementing this aspect of the invention includes an input device, a computing device coupled to the input device and having a cryptographic processor and a memory, and an output device. The input device receives data used to generate the authenticatable code, at least a portion of which is specific to the document and identifies the document. This data might include for example, in the case of a check, the check number, amount and name of the payee, as opposed to image data for the entire check. The computing device receives a signal embodying the data and, in accordance with instructions in the memory, performs a cryptographic operation based on the data to produce encrypted authentication data unique to the document. The output device is coupled to the computing device and affixes a representation of the authentication data (the encrypted code) on the document.

In general, the recipient of the document will verify the code by performing some combination of hashing and decryption appropriate to the particular combination of cryptographic operations used to create the code.

Another unique aspect of our invention involves deciphering a code previously affixed to a document to verify the authenticity of the document. A device used to implement this aspect of the invention includes an input device, a computing device coupled to the input device and having a cryptographic processor and a memory, and an output device coupled to the computing device. The input device receives document identification data and encrypted authentication data from the document (not an image of the document). The computing device receives signals representing the identification data and the authentication data. In accordance with instructions in the memory, the computing device performs a cryptographic operation based on the encrypted authentication data to produce decrypted authentication data, and performs a comparison of the decrypted authentication data with the document identification data. A representation of the authenticity of the document, based on the comparison performed by the computing device, is displayed using the output device.

In either of the devices described just above, the computing device may be configured to be resistant to tampering. Encryption for authentication and decryption for verification may be carried out using public key cryptography.

The public key employed in the verification process could either be obtained from a public database or distributed using digital certificates within the device. Alternatively, instead of public/private key pairs, the device could use a symmetric key, either alone or in combination with public key cryptography.

The apparatus may include additional features to increase confidence therein. For example, when authenticating a document, the device may include a unique device ID in the stamped code to identify itself to a recipient of the document. Furthermore, the device may prevent re-use of a previously generated code by using a challenge-response protocol in which the requester transmits a random number to the device for inclusion in the stamped code. Alternatively, the device may contain a random number generator for internal generation of the random number. Those skilled in the art will appreciate that the challenge can use any datum whose value is unpredictable by the recipient; random numbers happen to be a particularly convenient choice.

DETAILED DESCRIPTION OF THE PREFERRED EMBODIMENTS

Figure 1:
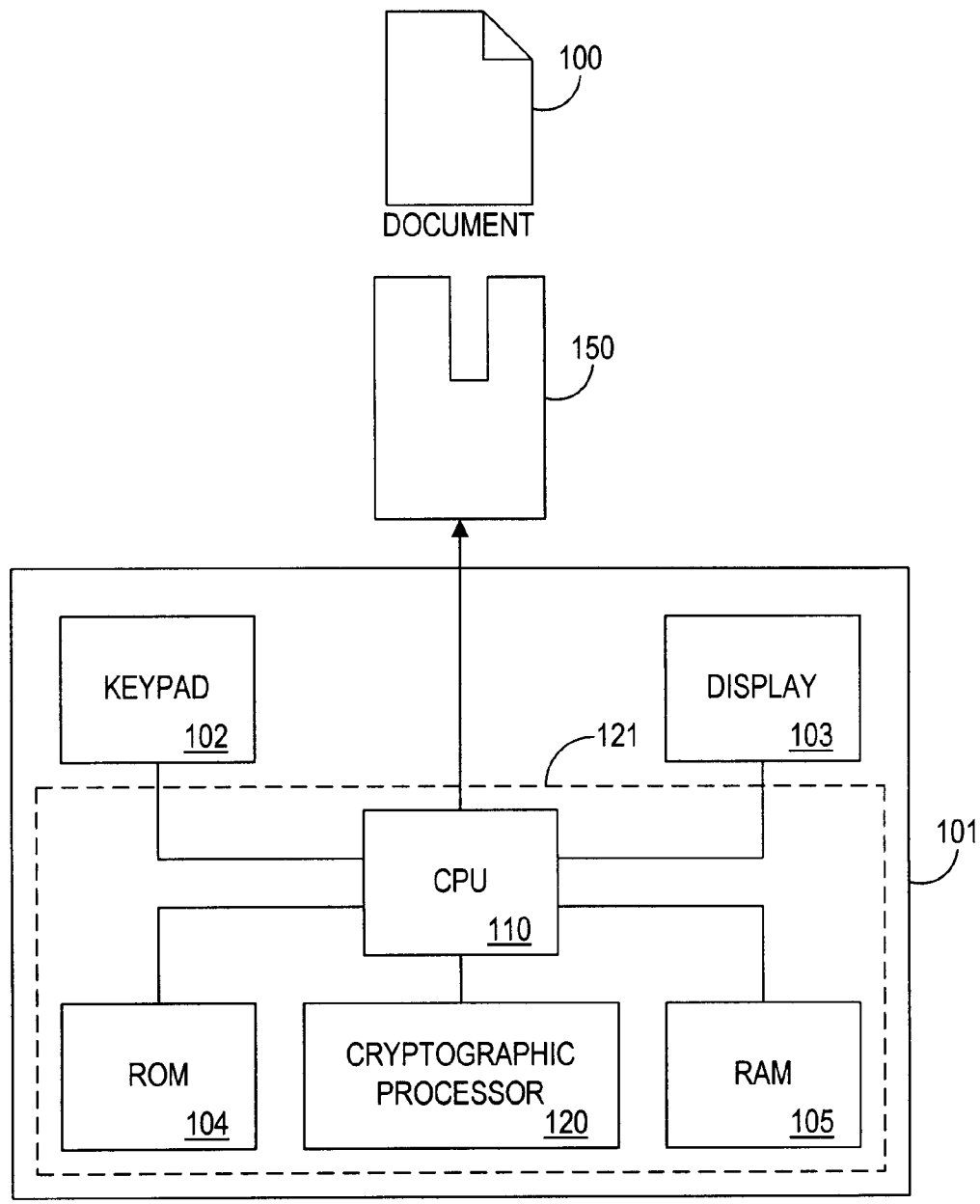
FIG. 1 is a schematic block diagram illustrating a first embodiment of the invention, which comprises a self-contained authenticatable data stamp apparatus.

An apparatus constructed according to a first embodiment of the invention is shown schematically in FIG. 1. The apparatus comprises a device 101 which includes a cryptographic processor 120 located within a tamper-resistant housing 121. The cryptoprocessor 120 is controlled by a CPU 110 which executes programs stored in ROM 104 and/or RAM 105. The CPU 110 also is connected to a stamper 150 which stamps a code onto a document 100, a keypad 102 used to enter information relating to the document, and a display 103 for displaying the result of a verification process.

The cryptoprocessor 120 can be a general purpose processor (e.g., an Intel CPU) receiving instructions from ROM 104 or RAM 105, or it can be a special purpose processor optimized for performing cryptographic operations (e.g., a National Semiconductor iPower SPU or smart-card chip). That is, the cryptoprocessor 120 may comprise any hardware or software engine capable of performing cryptographic operations on a given quantity. As described in greater detail below, such operations may include both keyless and keyed operations, as well as various combinations thereof.

The tamper-resistant housing 121 may include physical, electronic, or a combination of physical and electronic features to resist tampering. For example, physical features could include encapsulation, electronic features could include a silicon firewall, and combination features could include self-zeroizing, or otherwise volatile, ROM 104 or RAM 105 which electrically modifies its contents upon detection of tampering. Such tampering might include physically stressing the device, or electrically tampering by applying power to the device outside allowable current or voltage ranges, or outside an allowable AC frequency range. Alternatively, the housing 121 could be merely tamper-evident. In that case, the process of document verification should include checking the device for evidence of tampering. As will be appreciated by those skilled in the art, a great variety of tamper-resistant or tamper-evident techniques can be deployed, and will not be enumerated in detail herein. Therefore, as a matter of convenience, terms such as "tamper resistant" or "secure" shall be understood to refer to any of the aforementioned or other security measures throughout this discussion.

Besides the stamper 150, other devices for affixing the encrypted code to the document may be used; for example, a label printer which prints the code on an adhesive label and then sticks the label onto the document. The code itself may take any of a number of forms, including a human-readable character string, a graphic "watermark," a barcode sequence and a digital representation on a magnetic medium on the document. The terms "code" or "stamped code" shall be understood to refer to any such embodiment.

Figure 2:
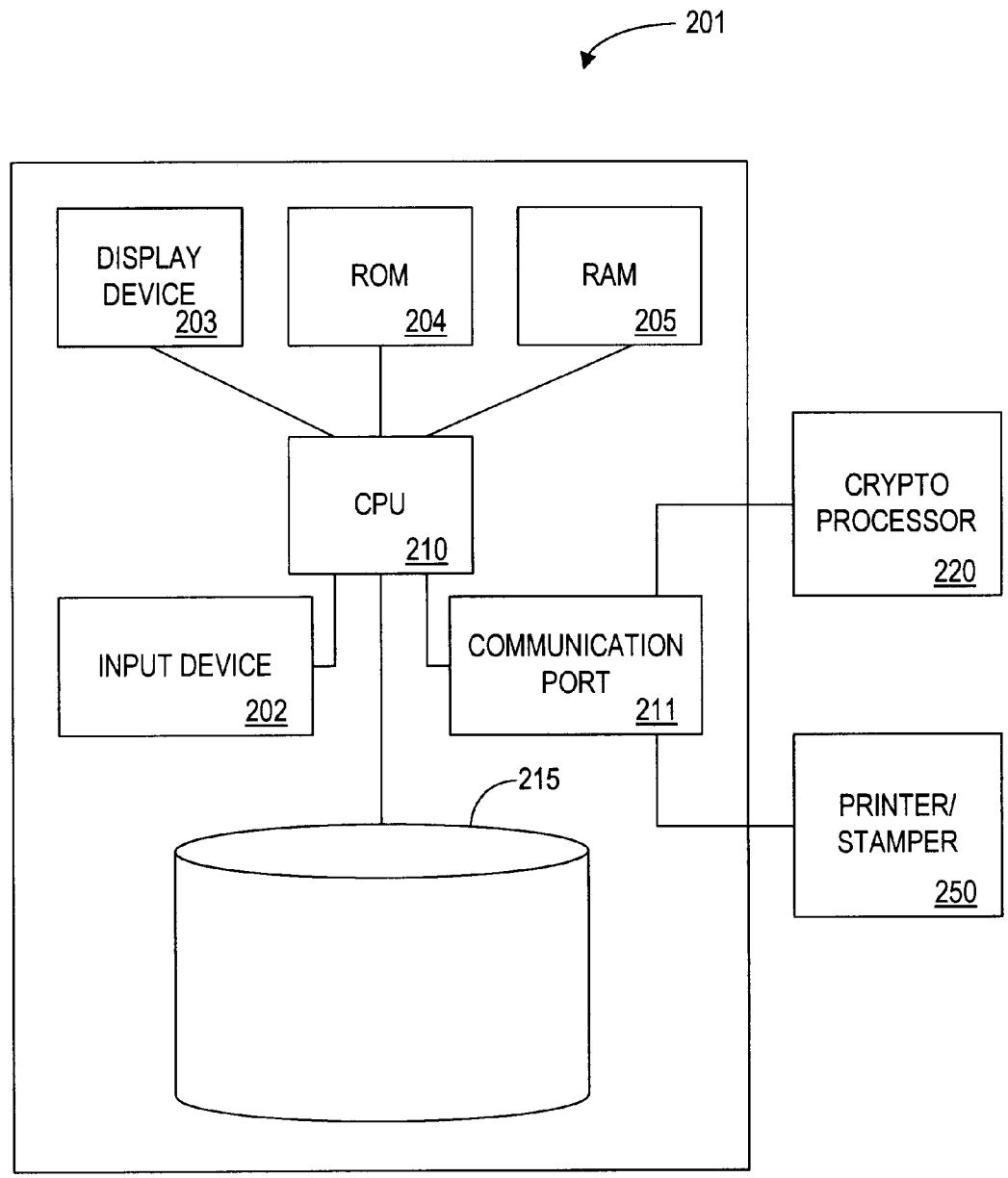
FIG. 2 is a schematic block diagram illustrating a second embodiment of the invention, which comprises a computer-based system for applying and verifying an authenticatable data stamp to a document.

The foregoing embodiment of the invention involves a self-contained, stand-alone apparatus for authenticating and verifying a document. A second embodiment of the invention involves an authentication/verification device configured as a hardware/software add-on interfaced with a computer, as shown schematically in FIG. 2. In this embodiment, the device according to the invention includes a cryptoprocessor 220 and a printer/stamper 250; the device communicates with the computer 201 through a communication port 211. The communication port 211 might be a parallel port or card slot. The computer 201 typically includes a CPU 210, an input device 202, a display device 203, ROM 204, RAM 205 and a data storage device 215.

To authenticate a document in this embodiment, data relating to a document is inputted to the computer 201 using the input device 202. The cryptoprocessor 220 receives the document variable information from the computer 201 and transmits a unique, encrypted authenticatable code to the computer, which is then stamped on the document by the stamper 250. The cryptoprocessor 220 is also used to verify a document's authenticity by deciphering a previously stamped code which is read into the computer 201 using the input device 202. The stamper 250 and the stamped code may be configured in a variety of ways, as discussed above with reference to the first embodiment.

The process of authenticating a document is shown schematically in FIG. 3, and will be described with reference to the apparatus of FIG. 1. The CPU 110 receives variable document data (that is, data specific to the particular document being authenticated) entered by a user with the keypad 102, and stores this data in RAM 105 (step 310). If the document is a check, for example, the variable document data may include the check number, the check amount, the payee's name, the signatory, and/or the date. The CPU 110 also receives private key data and stores this data in RAM 105 (step 320). The cryptoprocessor 120 encrypts the document data with the private key data to generate a unique, encrypted, authenticatable code for the document (step 330). The CPU 110 transmits that code to a stamper 150, which affixes the code onto the document 100 (step 340).

The degree of cryptographic processing depends on the degree of security that is desired. For example, where the primary concern is date integrity of the document, a simple one-way algorithm, e.g. a one-way hash function such as SHA-1 or MD-5, message authenticity code (MAC) such as H-MAC or N-MAC, or cyclic redundancy check (CRC), applied to the date, might be adequate. These algorithms are described in detail on Applied Cryptography, 2nd Edition (by Bruce Schneier, John Wiley & Sons, 1996), and need not be described here. Alternatively, a unique device identification number, stored in ROM 104 or RAM 105, can be added to the hash to provide assurance of device authenticity.

In the simplest embodiment of the invention, the device 101 generates a code from the variable data and outputs a stamped code (or message) consisting of the cleartext data plus a one-way function representative of the data (or a portion thereof). As used herein, a one-way function is one that outputs a unique representation of an input such that a given output is likely only to have come from its corresponding input, and such that the input can not be readily deduced from the output. Thus, the term one-way function includes hashes, message authenticity codes (MACs—keyed one-way functions), cyclic redundancy checks (CRCs), and other techniques that are well known to those skilled in the art. See, for example, Bruce Schneier, "Applied Cryptography," Wiley, 1996. As a matter of convenience, the term "hash" will be understood to represent any of the aforementioned or other one-way functions throughout this discussion. Typically, the hash would be performed by the cryptoprocessor using a hardwired hashing algorithm or one stored in ROM or RAM. The hash may either be a keyed or keyless operation.

The cryptoprocessor could also be programmed to receive a time signal (either from a clock included in the device or from an external source such as a GPS receiver) and to encrypt the time signal with the private key, thereby providing assurance that the document was authenticated by a particular device at a particular time.

The private key employed by the cryptoprocessor to generate the unique document code may also have alternate embodiments. For example, the private key may be data which is entered by the user through the keypad (or some alternate input device). Alternatively, the private key may be stored in the ROM and read by the cryptoprocessor at the time of encryption.

Where the device is used to process a sequence of inputted items of information (such as the date followed by the check number), a chain of hashes—where the encrypted representation of each item also includes representations of one or more previous items—provides an additional assurance of authenticity. In other cases, the private key stored in the ROM of the device may be specific to that device, to authenticate use of the particular device as well as to authenticate the document. Even greater assurance can be provided by adding unique device IDs, witness IDs, challenge-response protocols, digital certificates, combinations of symmetric encryption (such as DES, IDEA, RC4, or Blowfish) and asymmetric (public key) encryption (such as RSA, ElGamal, DSA), and many other cryptographic techniques, in patterns appropriate to the particular application at hand.

In a simple embodiment of the invention, the code affixed to the document 100 in the authentication process by the stamper 150 is a human-readable string of characters. This string of characters may then be inputted to the device 101 using the keypad 102 in order to verify the authenticity of the document 100. The verification process is shown schematically in FIG. 4, and will be described with reference to the apparatus shown in FIG. 1. As in the authentication process, the CPU 110 receives variable document data inputted through the keypad 102; this data is stored in RAM 105 (step 410). CPU 110 also receives data relating to a public key, and stores this data in RAM 105 (step 420). The public key data may be inputted through the keypad 102, or stored in the ROM 104. CPU 110 then receives the encrypted code (step 430). If the apparatus of FIG. 1 is used, the code is inputted using the keypad 102; alternatively, if the code is not human-readable, the apparatus would include an input device suitable for reading the code and inputting it to the CPU. The cryptoprocessor 120 uses the public key data to decipher the encrypted code (step 440), thereby yielding document authentication data which is then compared (step 450) with the variable document data received in step 410.

The document is judged authentic (step 460) if the document authentication data based on the deciphered code agrees with the variable document data. Negotiation of the document is authorized for an authentic document (step 470) and rejected for a document not judged authentic (step 465). The result of the comparison may be outputted to the display 103, so that the display simply flashes "YES" or "NO," for example. Alternatively, the CPU may output the data from the deciphered code to the display 103, so that the user may see for himself how the variable data compares with the data from the deciphering step.

Figure 3:
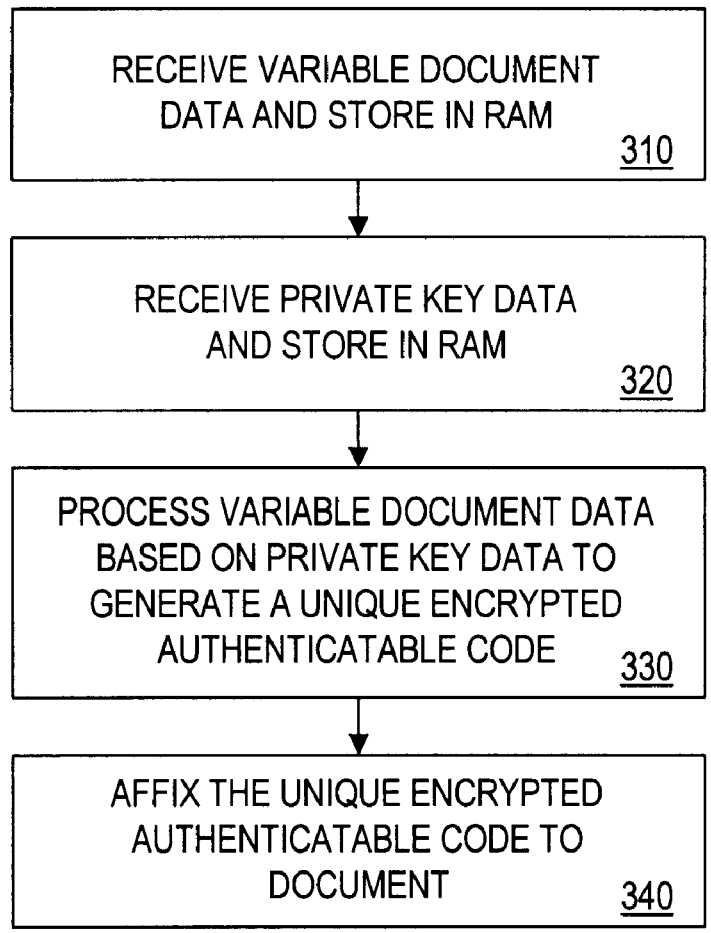
FIG. 3 is a flow chart illustrating a method of applying a unique encrypted authenticatable data stamp to a document.
Figure 4:
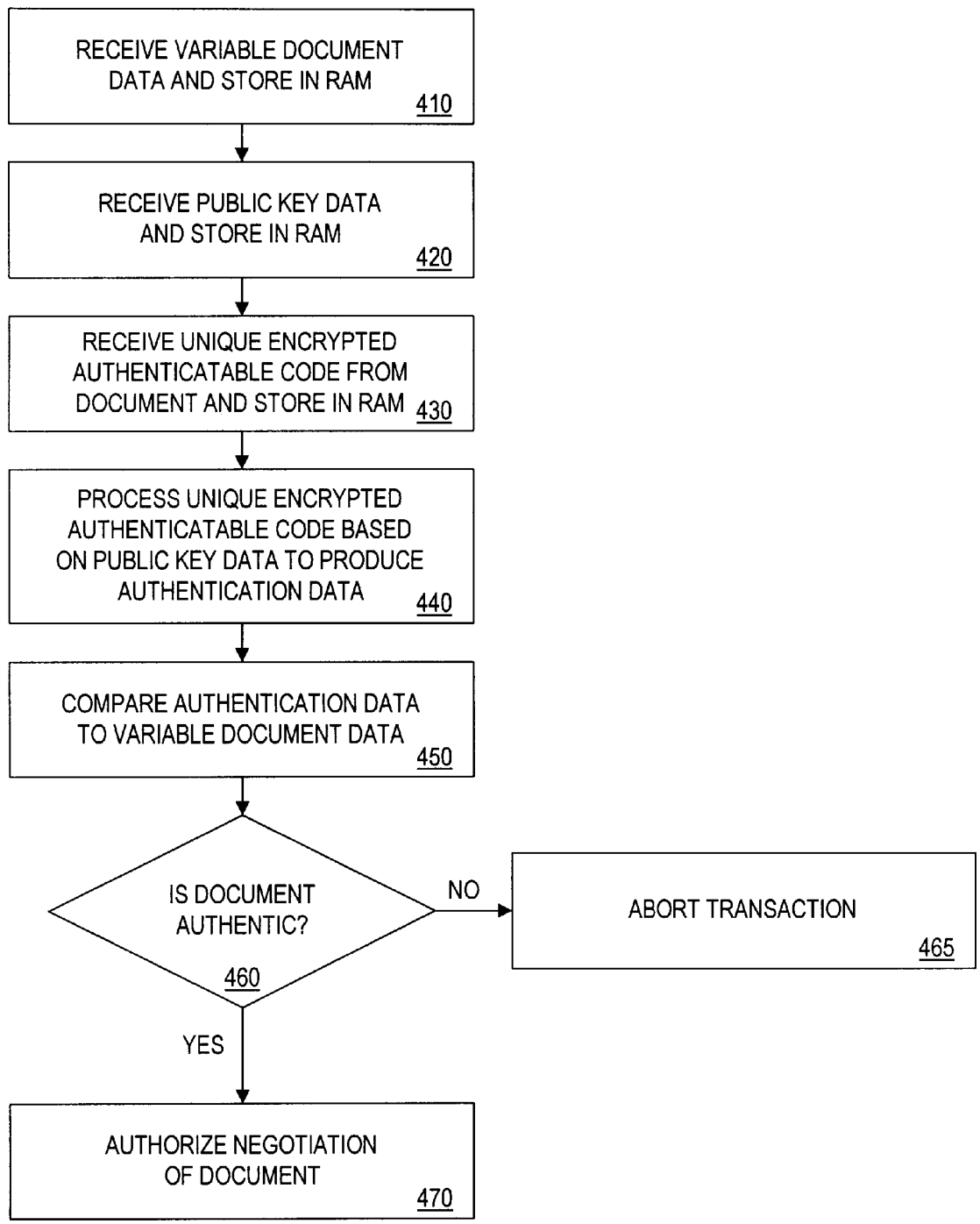
FIG. 4 is a flow chart illustrating a method of verifying the authenticity of a document bearing a unique encrypted authenticatable data stamp.

It will be appreciated that the processes shown in FIGS. 3 and 4 may be performed by the add-on device communicating with the computer 201 in a manner similar to the stand-alone device of the first embodiment.

Certain well-known enhancements to public key cryptography can also be used to provide greater assurance of document authenticity. For example, the stamped code could include digital certificates for public key distribution to a party that does not know the device public key needed to verify a stamped code encrypted with the device private key. In a digital certificate, the device public key is encrypted (and vouched for) by the private key of a trusted certifier (e.g., a well known manufacturer of the authenticating device) whose public key is known to the recipient of the document. The recipient uses the certifier's public key to decrypt the device public key, then uses the device public key to verify the information on the document. Alternatively, the recipient could simply obtain the device public key from a publicly accessible database, eliminating the need for digital certification.

To this point, asymmetric (public key) encryption has been discussed in the context of the various cryptographic operations. However, symmetric key (e.g., DES, IDEA, RC4, Blowfish) key encryption is also possible, either as a replacement for, or adjunct to (e.g., a symmetric session key transmitted using public key cryptography) public key cryptography.

Another commonly used cryptographic technique, the so-called challenge-response protocol (CRP), may be used to ensure to a recipient that a stamped code is current, i.e., not a copy of a previously used code. This technique would be particularly useful in cases where recurring documents are employed with few if any changes, such as payroll checks or other periodic payments. In the CRP, a requester challenges the device by transmitting a datum to the device, and checking for the same datum in the received response. Thus, reused codes are prevented (or at least detectable) because a reused code would contain a datum corresponding to a previous request/reply pair, rather than the current datum. Those skilled in the art will appreciate that the challenge can use any datum whose value cannot be predicted by the recipient; random numbers happen to be a particularly convenient choice. Alternatively, the device could include a random number generator to generate random numbers internally. In this somewhat weaker version of the CRP, the recipient would not necessarily know that the stamped code was unique, but only that he had not been sent a copy of a code he himself had previously received.

Although certain exemplary cryptographic operations (hashing, asymmetric encryption, symmetric encryption, digital certificates, and challenge-response protocols) have been disclosed for use singly or in specified combinations, those skilled in the art will appreciate that many other combinations of these basic operations may be used, depending on the needs of the specific application.

As noted above, in cases where the variable document information is encrypted with the device private key, the recipient can then simply decrypt the stamped code and perform any other cryptographic operations needed to verify the information on the document. The recipient would look up the corresponding public key from a public database, read the stamped code from the document, decrypt the code using the public key, and determine and verify the variable document data. Alternatively, as suggested earlier, digital certificates could be used to distribute the device public key to a recipient. In certain situations, the above procedures are not possible—for example: 1) when public key cryptography is not used, 2) when it is desired to keep the cryptographic algorithms confidential from the recipient, or 3) when the recipient lacks the capability to perform cryptographic verifications. In such cases, the verification can be implemented by a public database located on a central computer accessible via a free or toll-based telephone line. A caller would use his touch-tone keypad to enter the ID number for the device, and then enter the stamped code (assuming the stamped code consists of human-readable characters). The central computer would use the ID number to look up the database record for that particular device, retrieve its cryptographic key, and use the cryptographic key to perform the appropriate cryptographic operation (recomputed hash, decryption, etc.) and provide a confirmation to the caller. If the stamped code is not human-readable, the caller would employ an input device for reading the code and transmitting the code over the telephone line to the central computer.

Figure 5:
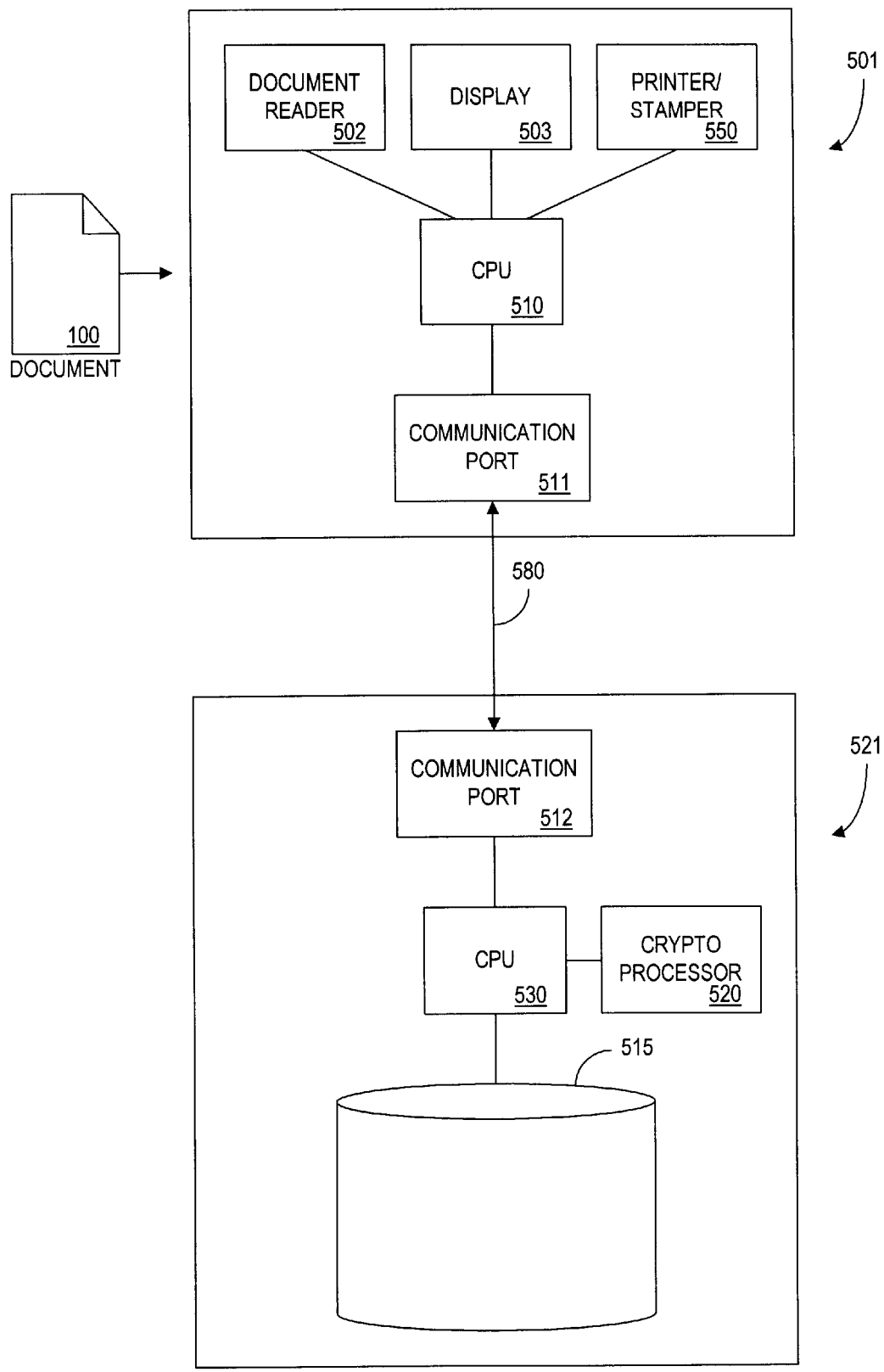
FIG. 5 is a schematic block diagram illustrating a third embodiment of the invention, which comprises a device for authenticating and verifying a document, the device being located remotely from a central computer and a cryptoprocessor.

Another embodiment of the invention, which uses the procedure outlined just above, is shown schematically in FIG. 5. In this embodiment, the cryptoprocessor 520 is located remotely from both the point of authentication and the point of verification, and communicates with the authentication/verification device 501 over a telephone line 580 through communication ports 511 and 512. Cryptoprocessor 520, controlled by a CPU 530, accesses keys stored in the data storage device 515. Cryptoprocessor 520 and/or data storage device 515 may be located within a secure perimeter 521. As in the previous embodiments, information from a document 100 is input to the device 501; for example, selected fields on the document are scanned by a document reader 502. If the document is to be authenticated, the document-specific data is received by the CPU 510 which transmits the data to the cryptoprocessor and then receives the encrypted data from the cryptoprocessor to be printed on the document by the printer 550. If the document is to be verified, the device 501 transmits the stamped code on the document to the cryptoprocessor and then displays the decrypted information on the display device 503. An advantage of this arrangement is that the cryptoprocessor and keys are maintained in a single secure location.

While the present invention has been described above in terms of specific embodiments, it is to be understood that the invention is not limited to the disclosed embodiments. On the contrary, the present invention is intended to cover various modifications and equivalent structures included within the spirit and scope of the appended claims.

We claim:

1. A device for indicating and verifying the authenticity of a document using data appearing on the document, the device comprising:

an input device for receiving document identification data from the document when indicating the authenticity of the document, wherein at least a portion of the identification data is specific to the document and identifies the document, and for receiving the document identification data and encrypted authentication data from the document when verifying the authenticity of the document;

a computing device, including a cryptographic processor and a memory, coupled to said input device to receive a first signal representing the document identification data when both indicating and verifying the authenticity of the document, and to also receive a second signal representing the encrypted authentication data when verifying the authenticity of the document and, in accordance with instructions in the memory, to perform a first cryptographic operation based on the document identification data to produce encrypted authentication data unique to the document when indicating the authenticity of the document, and to perform a second cryptographic operation based on the encrypted authentication data to produce decrypted authentication data and to perform a comparison of the decrypted authentication data with the document identification data when verifying the authenticity of the document;

a first output device, coupled to said computing device, for affixing a representation of the encrypted authentication data on the document when indicating the authenticity of the document; and a second output device, coupled to said computing device, for displaying information regarding the authenticity of the document based on the comparison when verifying the authenticity of the document.

2. A device according to claim 1, wherein the memory is configured for storing a device identification, and a representation of the device identification is included in the encrypted authentication data.

3. A device according to claim 1, wherein said computing device is configured to be resistant to tampering.

4. A device according to claim 1, wherein said computing device is configured to show evidence of tampering.

5. A device according to claim 1, wherein the first cryptographic operation includes a one-way function.

6. A device according to claim 1, wherein the first cryptographic operation includes encryption with an encryption key.

7. A device according to claim 6, wherein the encryption key belongs to an asymmetric cryptographic protocol.

8. A device according to claim 6, wherein the encryption key belongs to a symmetric cryptographic protocol.

9. A device according to claim 6, wherein the encryption key is stored in the memory and is specific to the device.

10. A device according to claim 6, wherein the encrypted authentication data includes a digital certificate for distribution of a public key to be used to decrypt the encrypted authentication data.

11. A device according to claim 1, wherein said computing device is configured to receive a time signal, and a representation of the time signal is included in the encrypted authentication data.

12. A device according to claim 11, further comprising a clock for generating the time signal.

13. A device according to claim 11, further comprising a signal receiver for receiving the time signal from an external source.

14. A device according to claim 11, wherein the memory stores a device identification, and a representation of the device identification is included in the encrypted authentication data.

15. A device according to claim 1, wherein said computing device is configured to receive a datum for use with a challenge-response protocol.

16. A device according to claim 15, wherein said input device is configured to input the datum to said computing device.

17. A device according to claim 15, further comprising a number generator for supplying the datum as a random number.

18. A device according to claim 1, wherein said first output device is a printer.

19. A device according to claim 18, wherein the printer is configured for producing a dot-based output.

20. A device according to claim 18, wherein the printer is configured for producing a character-based output.

21. A device according to claim 18, wherein the printer is configured for producing a barcode.

22. A device according to claim 18, wherein the printer is configured for printing the representation of the encrypted authentication data on a label and affixing the label on the document.

23. A device according to claim 1, wherein said first output device is configured for encoding the representation of the encrypted authentication data as a digital representation on a magnetic medium affixed to the document.

24. A device according to claim 1, wherein said input device is a keyboard.

25. A device according to claim 1, wherein said input device is configured to scan a portion of the document.

26. A device according to claim 1, wherein the second cryptographic operation includes decryption with a decryption key.

27. A device according to claim 26, wherein the decryption key belongs to an asymmetric cryptographic protocol.

28. A device according to claim 26, wherein the decryption key belongs to a symmetric cryptographic protocol.

29. A device according to claim 26, wherein the decryption key is stored in the memory and is specific to the device.

30. A device according to claim 26, wherein the decryption key is a public key obtained from a publicly accessible database, and said input device is configured to input the decryption key to said computing device.

31. A device according to claim 1, wherein said computing device is configured to produce a time signal based on the decrypted authentication data.

32. A device according to claim 1, wherein said computing device is configured to produce a device identification based on the decrypted authentication data.

33. A device according to claim 1, wherein said computing device is configured to perform a challenge-response protocol based on the decrypted authentication data.

34. A device for indicating and verifying the authenticity of a document using data appearing on the document, the device communicating through a communication port with a computing apparatus that reads document identification data when indicating authenticity of the document and reads document identification data and encrypted verification data from the document when verifying authenticity of the document, the device comprising:

a cryptographic processor, coupled to the communication port, for receiving a first signal representing the document identification data when both indicating and verifying the authenticity of the document and for receiving a second signal representing the encrypted authentication data when verifying the authenticity of the document and, in accordance with instructions in the memory, performing a first cryptographic operation based on the document identification data to produce encrypted authentication data unique to the document when indicating the authenticity of the document, and to perform a second cryptographic operation based on the encrypted authentication data to produce decrypted authentication data and to transmit a third signal representing the decrypted authentication data to the computing apparatus when verifying the authenticity of the document.

35. A device according to claim 34, further comprising an output device, coupled to the communication port, for affixing a representation of the encrypted authentication data on the document when indicating authenticity of the document.

36. A method of using a device for indicating and verifying the authenticity of a document using data appearing on the document, comprising the steps of:

determining whether the device is being used for indicating or verifying the authenticity of the document;

inputting document identification data from the document to a computing device including a cryptographic processor, at least a portion of the data being specific to the document and identifying the document and, when verifying authenticity, also inputting encrypted authentication data from the document to the computing device;

performing a first cryptographic operation on the document identification data with the cryptographic processor to produce encrypted authentication data unique to the document when indicating authenticity, and performing a second cryptographic operation on the encrypted authentication data to produce decrypted authentication data and performing a comparison of the decrypted authentication data with the document identification data when verifying authenticity; and affixing a representation of the encrypted authentication data on the document when indicating authenticity and displaying information regarding the authenticity of the document based on the comparison when verifying authenticity.

37. A method according to claim 36, wherein the first cryptographic operation includes a one-way function.

38. A method according to claim 36, wherein the first cryptographic operation includes encryption with an encryption key.

39. A method according to claim 38, wherein the encryption key belongs to an asymmetric cryptographic protocol.

40. A method according to claim 38, wherein the encryption key belongs to a symmetric cryptographic protocol.

41. A method according to claim 38, wherein said performing a first cryptographic operation step further comprises a step of including in the encrypted authentication data a digital certificate for distribution of a public key to be used to decrypt the encrypted authentication data.

42. A method according to claim 36, further comprising the steps of:

inputting a time signal to the computing device;

generating a representation of the time signal by the computing device; and including the representation of the time signal in the encrypted authentication data.

43. A method according to claim 36, further comprising the step of including a device identification in the encrypted authentication data.

44. A method according to claim 36, further comprising the steps of:

inputting a datum for use with a challenge-response protocol to the computing device; and performing the challenge-response protocol.

45. A method according to claim 36, wherein said affixing step comprises printing the representation of the encrypted authentication data on the document.

46. A method according to claim 36, wherein said affixing step comprises printing the representation of the encrypted authentication data on a label and affixing the label on the document.

47. A method according to claim 36, wherein said inputting step comprises scanning a portion of the document.

48. A method according to claim 36, wherein the second cryptographic operation includes a one-way function.

49. A method according to claim 48, wherein the second cryptographic operation includes decryption with a decryption key.

50. A method according to claim 49, wherein the decryption key belongs to an asymmetric cryptographic protocol.

51. A method according to claim 49, wherein the decryption key belongs to a symmetric cryptographic protocol.

52. A method according to claim 49, wherein said performing a second cryptographic operation step further comprises a step of deriving from the encrypted authentication data a digital certificate to obtain a public key to be used to decrypt the encrypted authentication data.

53. A method according to claim 36, wherein said performing a second cryptographic operation step further comprises the steps of:

deriving a time signal from the encrypted authentication data; and including a representation of the time signal in the decrypted authentication data.

54. A method according to claim 36, further comprising the steps of:

deriving a device identification from the encrypted authentication data; and including the device identification in the decrypted authentication data.

55. A method according to claim 36, wherein said inputting step comprises scanning a portion of the document.

56. A method according to claim 36, wherein said displaying information step comprises displaying an indication of the authenticity of the document using a display device connected to the computing device.

57. A method according to claim 36, wherein said displaying information step comprises displaying the decrypted authentication data using a display device connected to the computing device.

58. A device for verifying a document using document data appearing on the document, the device comprising:

an input device for receiving document identification data and encrypted authentication data from the document;

an output device for displaying information regarding authenticity of the document in accordance with document verification data;

a first communication device, coupled to said input device and to said output device, for transmitting a first signal representing the document identification data and a second signal representing the encrypted authentication data and for receiving a signal representing the document verification data;

a second communication device, located remotely from said first communication device and communicating therewith, for receiving the first signal and the second signal from said first communication device and for transmitting the signal representing the document verification data to said first communication device;

a computing device coupled to said second communication device, said computing device including a cryptographic processor and a memory, to receive the first signal and the second signal from said second communication device, to perform a cryptographic operation based on the authentication data in accordance with instructions in the memory to produce decrypted authentication data, to perform a comparison of the decrypted authentication data with the document identification data, to produce document verification data based on the comparison, and to generate the signal representing the document verification data.

59. A computer readable medium in which is stored computer readable code to be executed by a computer, said computer readable code performing a method comprising the steps of:

determining whether document authenticity is being indicated or verified;

inputting data from the document, at least a portion of the data being specific to the document and identifying the document and, when verifying authenticity, also inputting encrypted authentication data from the document; and performing a first cryptographic operation on the identification data to produce authentication data unique to the document when indicating authenticity, and performing a second cryptographic operation on the encrypted authentication data to produce decrypted authentication data and comparing the decrypted authentication data with the document identification data when verifying authenticity.

60. A non-cryptographic device for remotely verifying the authenticity of a document using data appearing on the document, comprising:

an input device for receiving identification data and encrypted authentication data from the document;

a communication device, coupled to the input device, for transmitting a first signal representing the identification data and a second signal representing the encrypted authentication data to a remote central controller, and for receiving a third signal representing document verification data from the central controller, the document verification data being produced by the central controller by performing a cryptographic operation based on the encrypted authentication data and the identification data; and an output device for displaying information regarding the authenticity of the document in accordance with the document verification data.

61. A method for remotely verifying the authenticity of a document using data appearing on the document, comprising the steps of:

inputting identification data and encrypted authentication data from the document;

transmitting a first signal representing the identification data and a second signal representing the encrypted authentication data to a remote central controller;

receiving a third signal representing document verification data from the central controller, the document verification data produced by the central controller by performing a cryptographic operation based on the encrypted authentication data and the identification data; and displaying information regarding the authenticity of the document in accordance with the document verification data.

* * * * *